United States Patent Office 3,564,070
Patented Feb. 16, 1971

3,564,070
PRODUCTION OF 2-METHYL-2-PENTENE
Ernest H. Drew, Corpus Christi, Tex., and Arthur H. Neal, Baton Rouge, La., assignors to Esso Research and Engineering Company, a corporation of Delaware
No Drawing. Filed Apr. 18, 1967, Ser. No. 631,607
Int. Cl. C07c 3/10
U.S. Cl. 260—683.15
6 Claims

ABSTRACT OF THE DISCLOSURE

A process in which propylene is dimerized with high selectivity to produce, in one step, reaction product mixtures rich in 2-methyl-2-pentene, a precursor for isoprene. Propylene is dimerized at relatively low pressure and temperatures in the presence of a catalytic mixture of transition metal acetyl acetonate and an alkyl aluminum halide. The transition metal acetyl acetonate, the metal of which is selected from nickel, cobalt and iron, and the alkyl aluminum halide react with an olefin promoter to generate the active catalyst. Selectivity to favor increased yields of 2-methyl-2-pentene, in the presence of the catalyst complex, increases with increased aluminum:transition metal ratios and also with increasing solvent polarity.

---

This invention relates to a process for the production of 2-methyl-2-pentene by catalytic dimerization of propylene. Propylene is dimerized, in solvent medium, by contact of the monomer with a catalyst comprising a mixture or complex formed by reaction between a transition metal enolate of an α,β-diketone, alkyl aluminum halide, and olefin. The dimerization reaction is highly selective, resulting in the formation of large amounts of the isomer 2-methyl-2-pentene, a compound of particular value as a precursor for isoprene. The selectivity for the formation of this particular isomer is sensitive to the ratio of the aluminum: transition metal employed in the formation of the catalyst and the polarity of the solvent medium within which the dimerization reaction is conducted. High aluminum:transition metal ratios and high solvent polarities favor increased yields of the 2-methyl-2-pentene isomer.

Various processes are known for the catalytic polymerization of propylene. The products recovered from such processes, however, contain considerable amounts of compounds of higher molecular weight than the hexenes; the distribution of compounds in a reaction product mixture generally conforming to a Poisson's distribution. Other processes, however, are more directly concerned with dimerization of propylene. In these types of processes, the concentrations of the isomers, though essentially hexenes, vary considerably. Relatively few processes are capable of yielding products containing high concentrations of the valuable 2-methyl-2-pentene isomer.

Unfortunately, however, all of the isomers of hexene are not suitable for formation of isoprene. A suitable isomer preferably contains a single carbon atom in a position beta to the double bond. This is because, generally, cracking precedes isomerization in the formation of isoprene. Of the hexene isomers, only 2-methyl-2-pentene and 2,3-dimethyl-1-butene are generally suitable for in the formation of isoprene.

The primary object of this invention is, therefore, to provide a process for controlled dimerization of propylene to yield, in a single step, reaction product mixtures of high hexene concentration, especially those containing high concentrations of the 2-methyl-2-pentene isomer. A further object is to provide new and improved catalysts, of high efficiency, for selective propylene dimerization.

These objects and others are achieved in accordance with the present invention by preparation and use of a catalyst mixture or complex formed from the transition metal enolate of an α,β-diketone, an alkyl aluminum halide and an olefin promoter. Propylene or propylene-containing gas is contacted with the catalyst at reaction conditions, and the desired reaction products are recovered, as by distillation.

In the formation of the catalyst, the transition metal enolate of an α,β-diketone is reduced with an alkyl aluminum halide and complexed with an olefin promoter to generate a catalyst suitable for active selective propylene dimerization to form 2-methyl-2-pentene. In the reaction, the internal vinyl carbon-hydrogen bond of the propylene is activated by the transition metal complex, this leading to the formation of 2-methyl-2-pentene.

The concentration of the 2-methyl-2-pentene in the product is also favored by high aluminum:transition metal ratios and increasing solvent polarities. The selectivity of the dimerization reaction for formation of 2-methyl-2-pentene isomer increases at aluminum:transition metal ratios of at least about 2:1, and higher. Preferably, the alumnum:transition metal ratio ranges from at least about 5:1 to about 15:1.

Various solvents can be used for conducting the reaction. Suitable solvents are those containing up to about 12 carbon atoms in the molecule, e.g., aliphatic hydrocarbons such as pentane, hexane, heptane, and the like; or aromatic hydrocarbons such as benzene, toluene, xylenes and the like. Polar solvents are preferred. Preferably, the solvent employed is one having a dielectric constant ranging at least about 2.5, measured at 20° C. Suitable solvents are those containing from 1 to about 12 carbon atoms in the molecule, e.g., substituted hydrocarbons such as chloroform, ethylene dibromide and the like. Preferably, the solvent employed is an aromatic compound. Exemplary of such solvents are chlorobenzene, dichlorobenzenes, chlorinated xylenes, chlorotoluene, bromobenzene and the like. Especially preferred solvents are those having dielectric constants ranging from about 5.0 to about 20, measured at 20° C. Exemplary of such solvents are chlorobenzene orthodichlorobenzene, p-chlorotoluene, and the like.

At least initially, a portion of the catalyst mixture or complex includes a transition metal enolate of α,β-diketone, or reaction product thereof, as represented initially by the following structural formula:

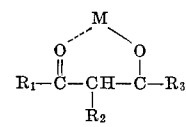

wherein M is a transition metal or Group VIII metal of the Periodic Chart of the Elements, preferably nickel, iron, or cobalt. $R_1$, $R_2$ and $R_3$ are the same or different and are selected from hydrogen and hydrocarbon radicals containing from 1 to about 6 carbon atoms, preferably from 1 to about 2 carbon atoms. $R_1$, $R_2$ and $R_3$ can thus be hydrogen, methyl, ethyl, propyl, isopropyl, amyl, or the like. More preferably, $R_2$ is hydrogen and $R_1$ and $R_3$ are methyl. Particularly suitable and preferred compounds are metallo acetylacetonates selected from the group consisting of nickel acetylacetonate, cobalt acetylacetonate, and iron acetylacetonate. Nickel acetylacetonate has proven to be the most outstanding and most effective of these compounds.

Alkyl aluminum halides suitable for the formation of the catalyst are, e.g., those having the general formula $$AlR_nX_{3-n}$$

wherein $n$ is an integer ranging from 1 to 2. R is alkyl and X is a halide. The alkyl group can contain from 1 to about 6 carbon atoms, and preferably the halide is chlorine or bromine. Particularly suitable compounds include diethyl aluminum chloride, ethyl aluminum dichloride, and mixtures of these, as well as bromine substituted halides, e.g., diethyl aluminum bromide and ethyl aluminum dibromide, or mixtures of these.

Olefins suitable for formation of the catalyst comprise those compounds containing from 2 to about 12 carbon atoms, and preferably from about 3 to about 8 carbon atoms. The compounds preferably contain from 1 to about 2 double bonds, or units of unsaturation. Preferred olefins are 1,5-cyclooctadiene and propylene. The latter is particularly preferred inasmuch as when using this compound there is no necessity to preform the catalyst mixture or complex.

Suitable reaction temperatures are those ranging from about −60° F. to about 100° F., though temperatures ranging from about 20° F. to about 100° F. are preferred. Pressures can range from substantially atmospheric to supra atmospheric. Preferably, pressures range from about atmospheric to about 500 pounds per square inch, and more preferably range from about atmospheric to about 100 pounds per square inch.

In the most preferred form of practicing the invention, the reaction mixtures contain from about 50 to about 90 weight percent, and higher, hexenes. More preferably, they contain from about 70 to about 90 weight percent, and higher, hexenes. Preferably also, at least about 10 weight percent of the hexenes is 2-methyl-2-pentene, and more preferably from about 40 percent to about 70 weight percent of the hexenes is 2-methyl-2-pentene. The desired product is usually recovered from the reaction mixture via distillation at atmospheric pressure or under vacuum.

The invention will be better understood by reference to the following illustrative examples.

In the example immediately following, propylene is 87 percent dimerized with 60 percent selectivity to 2-methyl-2-pentene, using a catalyst complex formed with nickel acetonylacetonate, diethylaluminum chloride, and 1,5-cyclooctadiene. An aluminum:nickel ratio of 14:1 is provided.

EXAMPLE I

To a stirred glass lined reaction vessel, fitted with a condenser and temperature recording device is charged, first, 26 parts by weight of a solution containing equimolar concentrations of nickel acetylacetonate and 1,5-cyclooctadiene in toluene. The vessel is then charged with approximately 14 weight parts of a hexane solution containing equi-molar concentrations of diethylaluminum chloride and ethylaluminum dichloride. The solution is introduced into the vessel at 77° F. in a nitrogen atmosphere.

Propylene is then introduced into the vessel at 40 pounds per square inch at 85–90° F., and is consumed at a rate of $6.6 \times 10^{-2}$ moles/minute.

The hexene olefin distribution after one mole of propylene reacts is:

| Olefin: | Percent |
| --- | --- |
| 4-methyl-1-pentene | 0.5 |
| 2,3-dimethyl-1-butene | 1.2 |
| 4-methyl-2-pentene | 6.0 |
| 2-methyl-1-pentene | 3.7 |
| 3-hexene | 19.4 |
| 2-methyl-2-pentene | 60.0 |
| 2-hexene | 3.7 |
| 2,3-dimethyl-2-butene | 5.5 |

The catalyst efficiency, based on the weight of product per weight of nickel charged; is well over 5000.

EXAMPLE II

When the foregoing example is repeated using chlorobenzene as a solvent, the selectively of the system to hexenes is greater than 90 percent, and the yield of 2-methyl-2-pentene isomer is increased.

EXAMPLE III

In further comparative runs, conducted in similar manner to that of Example I, iron acetylacetonate and cobalt acetylacetonate are complexed with propylene and equimolar mixtures of diethyl aluminum chloride and ethyl aluminum dichloride to form catalysts, and chlorobenzene is again employed as a solvent.

The selectivity of the solvent systems to hexene formation is 87.5 percent and 83 percent for the iron acetylacetonate and cobalt acetylacetonate, respectively. The yield of 2-methyl-2-pentene is more than twice as high for cobalt acetylacetonate as compared with iron acetylacetonate.

It is found as the aluminum:transition metal ratio is increased from about 2:1 to about 5:1, the rate of propylene consumption increases several fold. The rate of increase is more gradual between about 5:1 and 14:1. above about 14:1 increases in the ratio of aluminum-transition metal have little effect on the rate, as well as on the product distribution.

In forming active metal catalysts for propylene dimerization, it is found that nickel is highest in the relative order of reactivity. Cobalt is next highest in the relative order of reactivity, and thence iron. In relative order of selectivity, it is found that nickel, other conditions being held constant, is about six times more selective than cobalt, and cobalt about twice more selective than iron.

The greater the polarity of the solvent employed, the greater the selectivity toward formation of the 2-methyl-2-pentene, where other conditions remained unchanged. The higher yields of the 2-methyl-2-pentene isomer are generally obtained when using both a polar solvent and the nickel acetylacetonate as a part of the catalyst complex.

It is apparent that the present invention is susceptible to various changes and modifications without departing the spirit and scope thereof.

Having described the invention, what is claimed is:

1. A process for the preparation of 2-methyl-2-pentene, said process comprising the steps of contacting propylene at a temperature ranging from about 20° F. to about 100° F. under a pressure ranging from 14.7 p.s.i. to about 100 p.s.i in the presence of a solvent with a catalyst complex formed by mixing components consisting of:
   (a) nickel acetylacetonate,
   (b) diethyl aluminum chloride, ethyl aluminum dichloride, or mixtures thereof, and
   (c) 1,5-cyclooctadiene,
   and thence recovering a reaction product mixture containing 2-methyl-2-pentene.

2. The process of claim 1 wherein the aluminum: nickel ratio is at least about 2:1.

3. The process of claim 1 wherein the aluminum: nickel ratio ranges from about 5:1 to about 15:1.

4. The process of claim 1 wherein the reaction product mixture contains from 70 to 90 weight percent hexenes, and at least 40 to 70 percent of the hexene content is 2-methyl-2-pentene.

5. The process of claim 1 wherein the solvent is a compound having a dielectric constant, at 20° C., of at least about 2.5.

6. The process of claim 5 wherein the dielectric constant is one ranging from about 5.0 to about 20.

References Cited

UNITED STATES PATENTS

| | | | |
|---|---|---|---|
| 3,096,385 | 7/1963 | McConnell et al. | 260—683.15(D) |
| 3,306,948 | 2/1967 | Kealy | 260—680(B) |
| 3,321,546 | 5/1967 | Roest et al. | 260—683.15(D) |
| 3,355,510 | 11/1967 | Cannell et al. | 260—683.15(D) |
| 3,312,752 | 4/1967 | Schleimer | 260—680(B) |
| 3,341,617 | 9/1967 | Schleimer et al. | 260—680(B) |
| 3,390,201 | 6/1968 | Drew | 260—676 |

FOREIGN PATENTS

| | | | |
|---|---|---|---|
| 6612339 | 3/1967 | Netherlands | 260—683.15(D) |

PAUL M. COUGHLAN, Jr., Primary Examiner